(12) United States Patent
Gardner et al.

(10) Patent No.: US 7,529,026 B2
(45) Date of Patent: May 5, 2009

(54) OPTICAL SYSTEM WITH NANOSCALE PROJECTION ANTIREFLECTION LAYER/EMBOSSING

(75) Inventors: Daniel C. Gardner, Corvallis, OR (US); Arthur R. Piehl, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 257 days.

(21) Appl. No.: 11/116,333

(22) Filed: Apr. 28, 2005

(65) Prior Publication Data

US 2006/0245062 A1    Nov. 2, 2006

(51) Int. Cl.
G02B 27/10  (2006.01)
G02B 26/00  (2006.01)
G02F 1/03   (2006.01)

(52) U.S. Cl. .................. 359/619; 359/627; 359/290; 359/247

(58) Field of Classification Search .................. 359/619, 359/290–292, 298, 247, 260, 261, 263, 315, 359/317, 318, 627, 566, 569
See application file for complete search history.

(56) References Cited

U.S. PATENT DOCUMENTS

| 5,233,373 | A  | 8/1993  | Peters et al.    |
| 5,930,050 | A  | 7/1999  | Dewald           |
| 6,175,442 | B1 | 1/2001  | Booth, Jr. et al.|
| 6,317,171 | B1 | 11/2001 | Dewald           |
| 6,326,723 | B1 | 12/2001 | Raj et al.       |
| 6,343,862 | B1 | 2/2002  | Sawai et al.     |
| 6,388,372 | B2 | 5/2002  | Raj et al.       |
| 6,511,186 | B1 | 1/2003  | Burstyn et al.   |
| 6,524,756 | B1 | 2/2003  | Wu               |
| 6,570,710 | B1 | 5/2003  | Nilsen et al.    |
| 6,755,554 | B2 | 6/2004  | Ohmae et al.     |
| 6,770,225 | B2 | 8/2004  | Nilsen et al.    |
| 7,307,773 | B2 * | 12/2007 | Chen et al. .................. 359/290 |
| 7,355,780 | B2 * | 4/2008  | Chui et al. .................. 359/290 |
| 2002/0135869 | A1 | 9/2002  | Banish et al. |
| 2003/0095318 | A1 | 5/2003  | DiCarlo et al. |
| 2003/0117686 | A1 | 6/2003  | DiCarlo |
| 2003/0142382 | A1 | 7/2003  | DiCarlo |
| 2004/0051922 | A1 | 3/2004  | Kimura |
| 2004/0247010 | A1 | 12/2004 | Okada et al. |

OTHER PUBLICATIONS

Radar absorbers, "Electric-field loss mechanisms/Magnetic-field loss mechanisms", ARC Technologies, Inc., Part I and Part II, pp. 1-11 (2005).
Lalanne, P., et al., Nanotech., vol. 8, pp. 53-56 (1996) (Abstract).
"Why is the Texas Instruments Digital Micromirror Device (DMD) so reliable?", Douglass Paper, 6 pages.
Haupt, M., et al., "Polymer Masks on Semiconductors: A Novel Way to Nanostructures", Phys. State. Sol. (b), vol. 224, No. 3, pp. 867-870 (2001).
International Search Report for Application No. PCT/US2006/016286. Report issued Aug. 31, 2006.

* cited by examiner

Primary Examiner—Ricky L Mack
Assistant Examiner—Jack Dinh

(57) ABSTRACT

An optical system having a radiation transparent member and an anti-reflective embossment embossed into at least one surface of the transparent member. The embossment has spaced structures configured to permit incident radiation to pass through the embossment and the radiation transparent member, and to, at least, attenuate reflection of the incident radiation off the embossment. The structures are maximally spaced from one another by a subwavelength of the incident radiation.

24 Claims, 11 Drawing Sheets

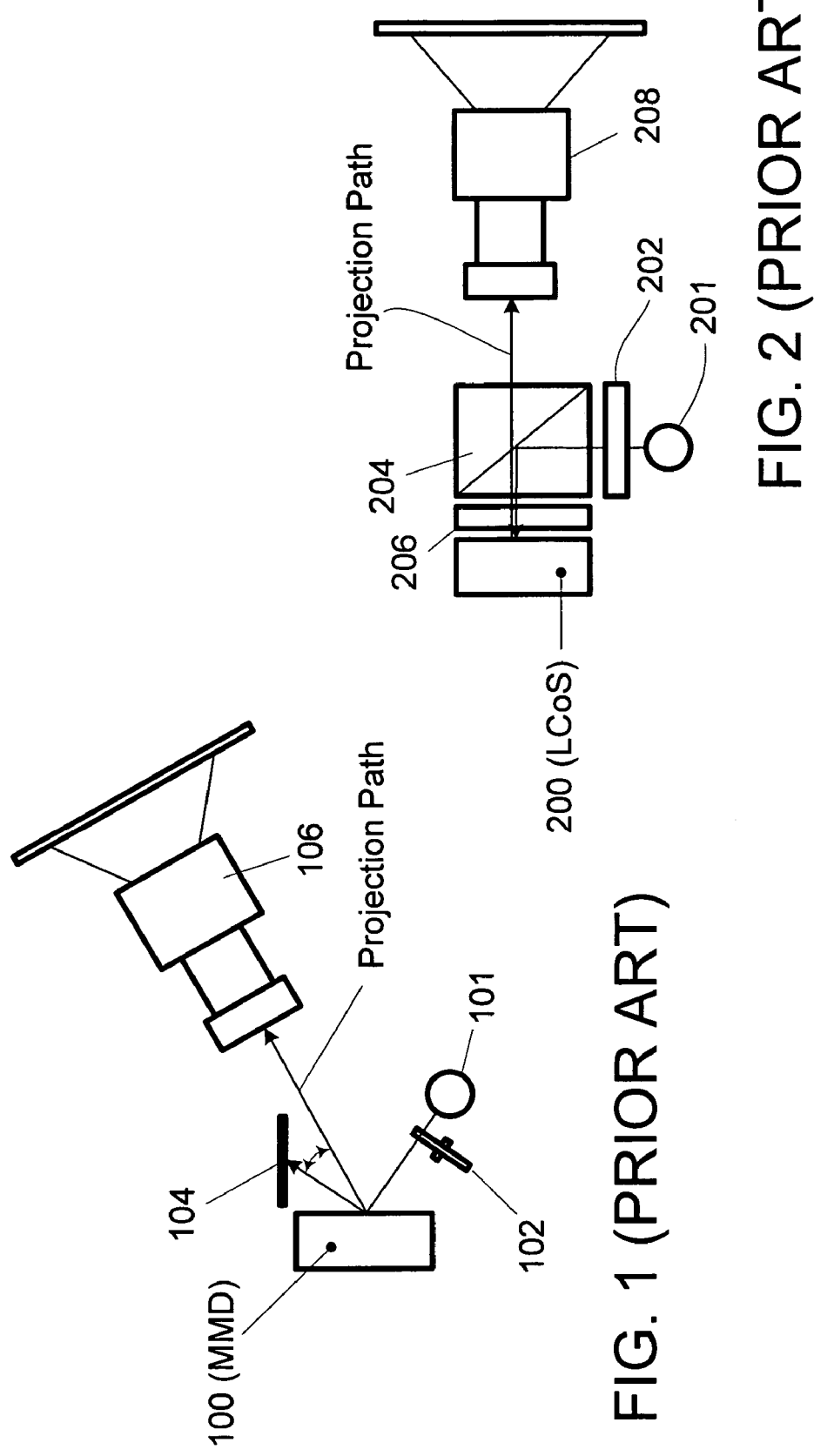

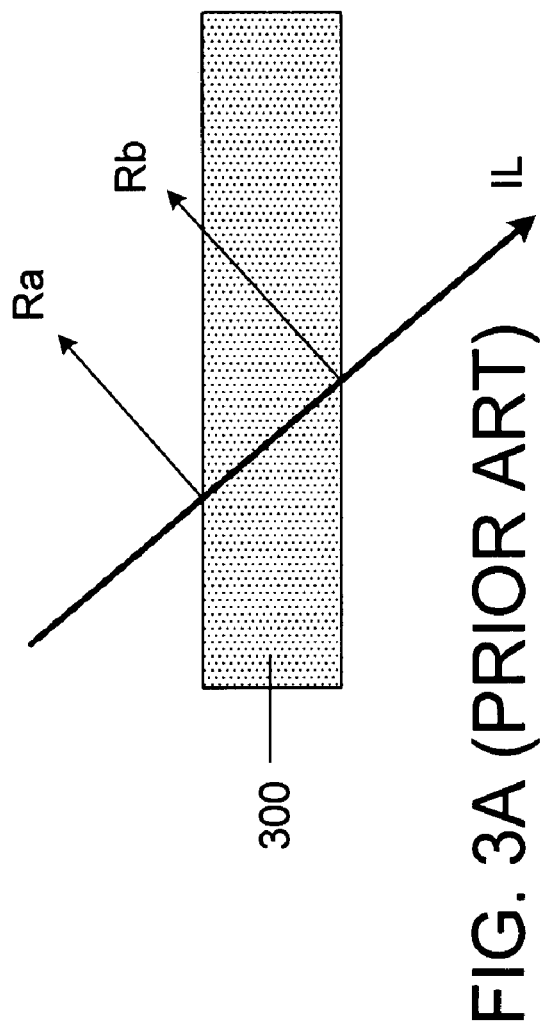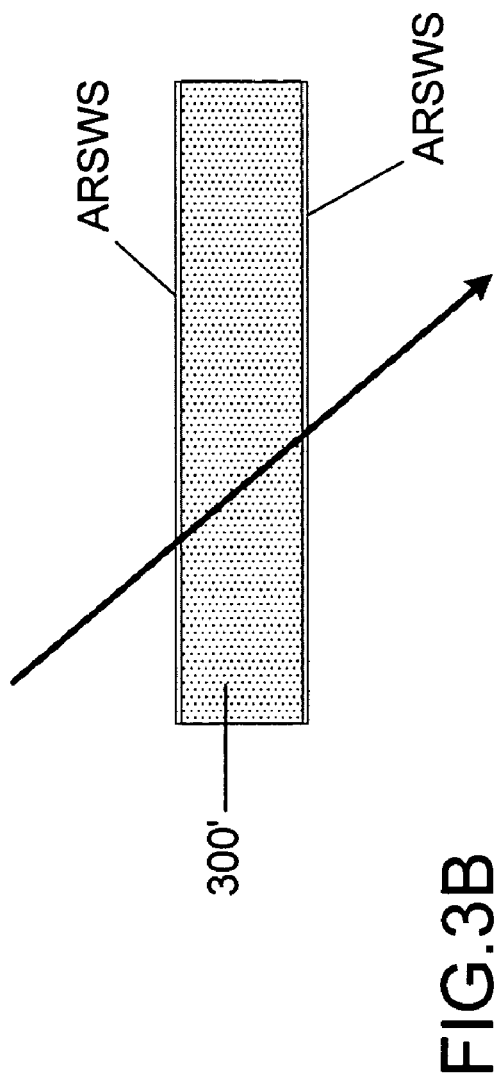
FIG. 3A (PRIOR ART)
FIG. 3B

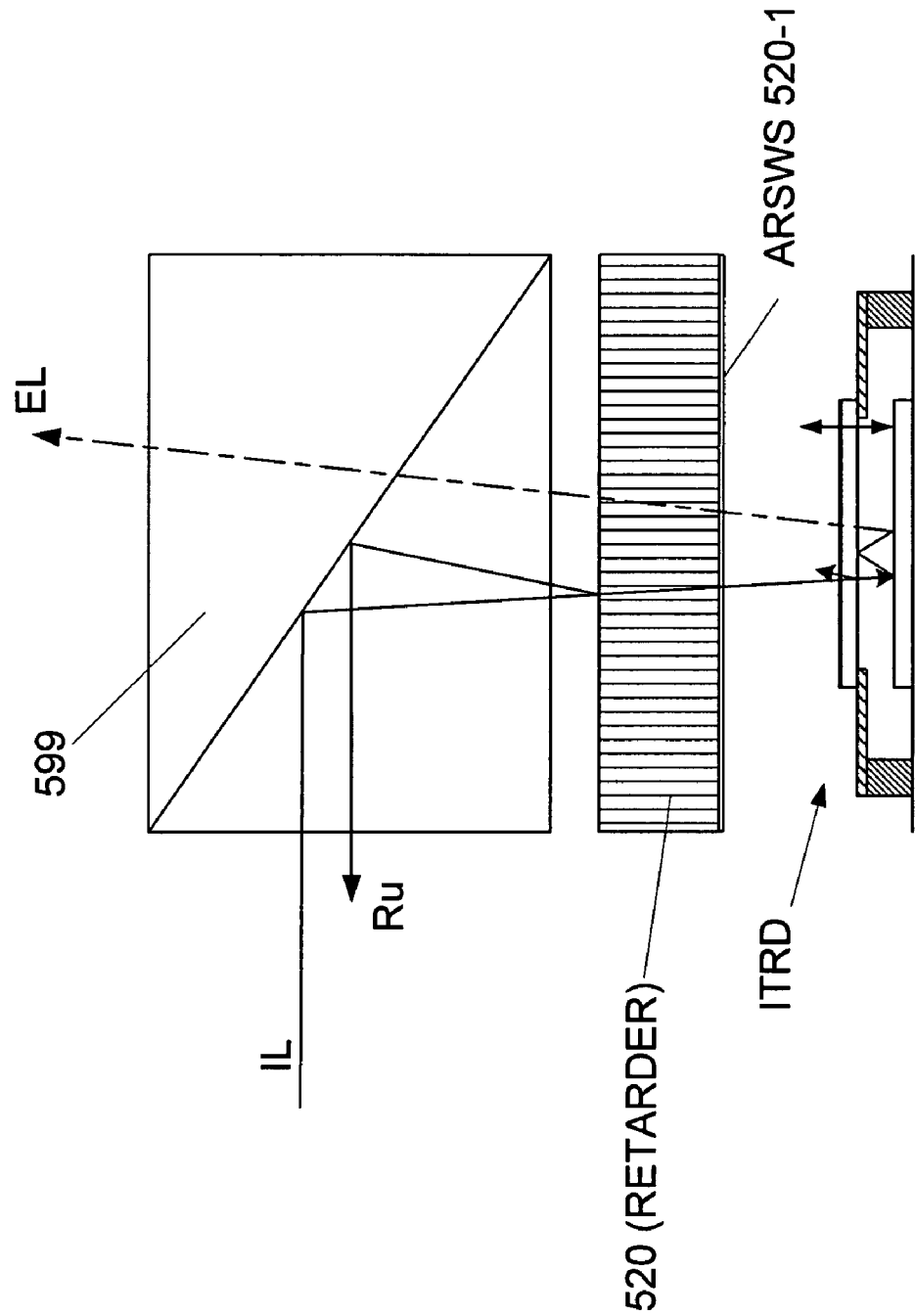

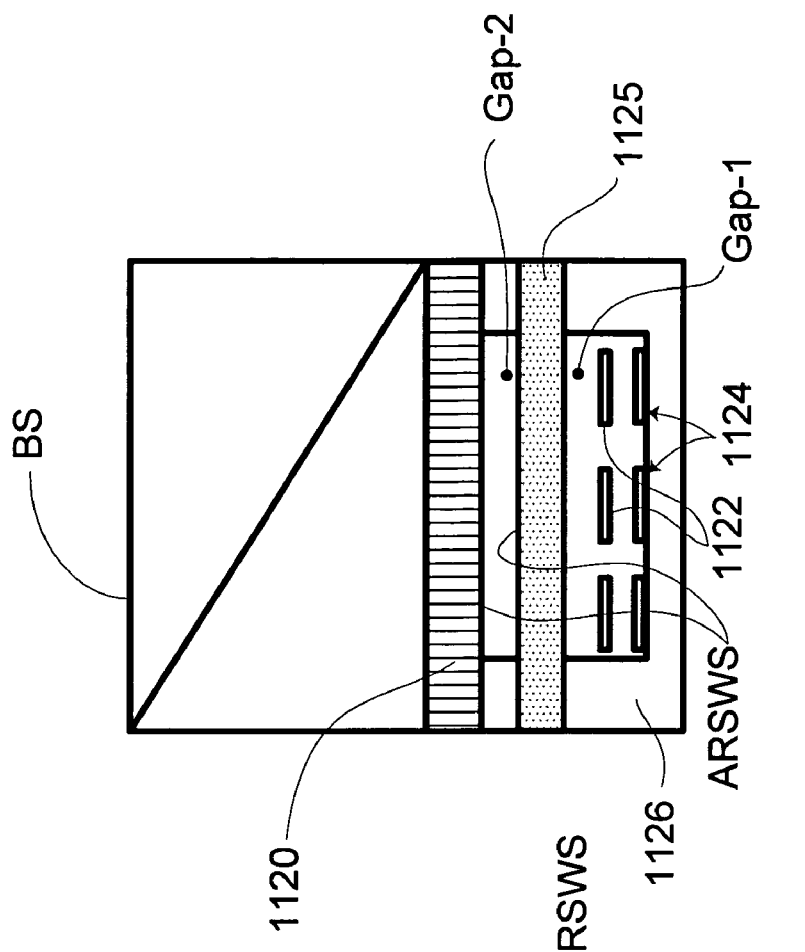
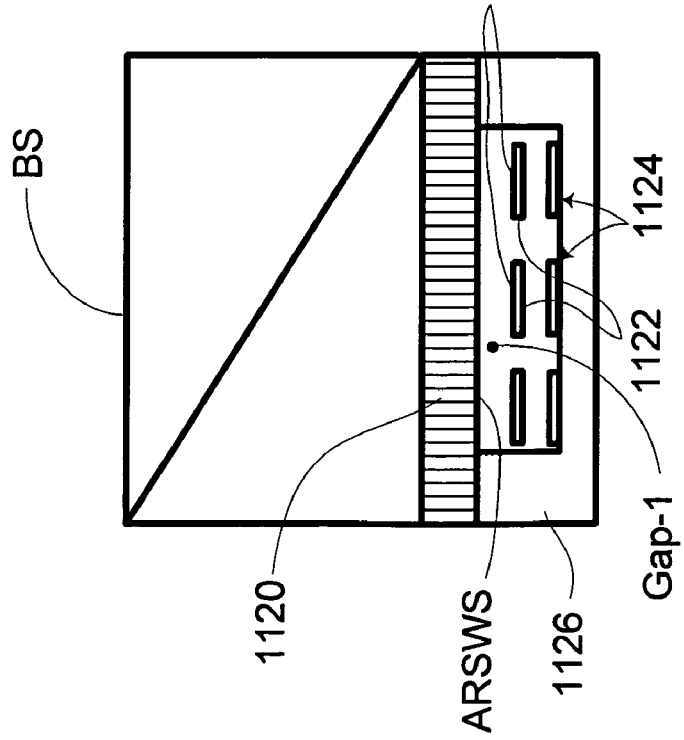
FIG. 11A
FIG. 11B

OPTICAL SYSTEM WITH NANOSCALE PROJECTION ANTIREFLECTION LAYER/EMBOSSING

BACKGROUND

Prior attempts to attenuate this unwanted reflection have involved single and multi-layer anti-reflective (AR) surface coatings. Single layer AR coatings are the most prevalent solutions for AR improvement in commercial optical systems. They generally reduce surface reflections ~100%, can be manufactured in high volume and are cost effective. The disadvantages when used in Spatial Light Modulator systems includes below average performance and integration challenges associated with anti-reflective coating material removal in certain areas of the device. Multi-layer AR coatings can reduce surface reflections in terms of contrast ratio by ~100-200% but the disadvantages over single layer coatings increases significantly in the areas of uniformity requirements, manufacturability, cost, and material removal; particularly when applied to the manufacturing of SLMS.

BRIEF DESCRIPTION OF THE DRAWINGS

FIGS. 1 and 2 are schematic diagrams depicting exemplary MMD projection and LCoS arrangements, respectively, in accordance with certain embodiments of the present invention.

FIG. 3A is a schematic diagram illustrating one way in which conventional transparent optical members may produce surface reflections.

FIG. 3B is a schematic diagram illustrating a reflection attenuating effect that can be produced by ARSWS embossments on upper and lower surfaces of a transparent member in accordance with certain aspects of the present invention.

FIG. 9 shows an embodiment of the present invention having a beam splitter and wherein transparent members are provided with ARSWS embossments.

FIGS. 11A and 11B are schematic diagrams showing single gap and dual gap packaging embodiments, respectively, to which the ARSWS embossing can be applied in accordance with certain embodiments of the present invention.

DETAILED DESCRIPTION OF THE EXEMPLARY EMBODIMENTS

Figure 4A:
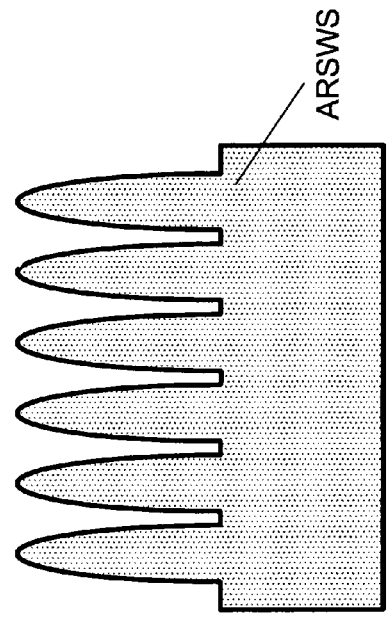
FIGS. 4A and 4B are schematic cross sections showing structured shaped "spires" which are formed on upper and lower surfaces of a transparent member, in accordance with certain exemplary embodiments of the present invention.

Embodiments of the invention are generally directed, but in no way limited, to use with radiation in the so called "white light" spectrum wherein the wavelength ranges from about 300 nm to about 800 nm and contains red, orange, yellow, green, blue and violet colored visible light. That is to say, the band or spectrum of radiation which falls between the non-visible IR (infrared) spectrum (above 800 nm) and the non-visible UV (ultraviolet) spectrum (below 300 nm).

While the embodiments of the invention are in no way limited specifically to the white light spectrum, technology has recently evolved to the point where it is possible to readily build nanoscale structures having nanometer ($10^{-9}$ meter) dimensions (for example) which are suited for attenuating reflection of radiation in the above mentioned white light spectrum. The term "nanoscale" structures, for example, will be understood to mean structures having dimensions which are measured in nanometer and which are less than a wavelength of the incident radiation.

More specifically, the disclosed embodiments of the present invention are directed to maximizing transmission, minimizing reflection and optimizing optical efficiency in SLMS reflection type optical systems (using white light) through the application of SWS (Subwavelength Structured Surface) structures on the pixel generating, optical and packaging surfaces. Embodiments of the invention reduce the reflection from an untreated optical surface (glass for example) from an average 4% reflection to less than 0.25%. The use of embodiments of the ARSWS (Anti-Reflective Subwavelength Structured Surface) improves the contrast ratio performance of SLMS designs with one or more reflective surface from 200-600% (in term of contrast ratio) with ARSWS performance of 0.25% and 600-1200% (in terms of contrast ratio) with ARSWS performance of <0.1%.

The use of the ARSWS enables product manufacturing and cost efficiencies through the use of self-assembly nano mask and/or nanoimprinting process technology to produce the ARSWS. It also enables reduced packaging and optical beam train design complexity.

In accordance with embodiments of the invention, graded-index, surface relief, subwavelength structures are applied to the transmitting and reflective optical surfaces of spatial light modulator devices such as, LCoS, DMMD and interferometer based arrangements. By treating beam propagation optics and packaging optical surfaces with ARSWS to minimize surface reflectance it is possible to maximize device contrast for light in the visible spectrum.

The surface patterns of the ARSWS are comprised of either a periodic or stochastically distributed structured array with geometric sizes on the order of or smaller than the wavelength of the incident light and an aspect ratio of from about 1:1 to about 3:1 or greater, such that the surface behaves like a homogeneous and continuous effective index gradient between the substrate and the surrounding medium. For the purposes of this disclosure those structures include geometries with a Gaussian, Quintic, Exponential, Motheye, Klopfenstein, and Random-Uniform taper with geometric features that minimize the average reflected power within the visible wavelength spectrum of 300-800 nm.

FIG. 1 schematically shows an exemplary MMD 100 arrangement which is arranged with a source of light 101, a color wheel 102, a light dump 104 and a projection lens 106. This arrangement is such that the white light which is produced by the source of light 101 is screened by the color wheel 102 so that red, green and blue light is sequentially directed against the micro mirrors of the MMD 100 and selectively directed either along the projection path or at the light dump 104. With this arrangement each mirror produces one pixel of the image.

FIG. 2 schematically shows an exemplary LCoS device 200 which is arranged with a source of light 201, an arrangement for selectively producing RGB (red, green and blue light) 202, a light splitter (prism) 204, a polarizing retarder 206 and a projection lens 208. It will be understood that these figures are totally schematic and are presented merely to establish the manner in which light is transmitted/reflected and are not intended to depict the complete operation/arrangement of such devices. The operation of this particular arrangement is such that the two of three fractions (viz., red, green and blue) of the white light from the light source 201 are selectively screened out such that only one of the fraction is permitted to enter the beam splitter 204 at a time. The LCoS device 200 generates the appropriate pixels of the given color and reflects them toward the projection lens. Sequential production of pixels of red, green and blue in the desired pattern enables a color image to be produced.

The above mentioned MMD and LCoS devices can be provided in encased packages which have windows (made of glass for example), and, as will be appreciated from FIG. 3A, are configured such that when light passes through a transparent element such as a glass layer or window 300, reflections Ra and Rb tend to be generated. In conventional MMD and LCoS arrangements undesired reflected light such as this may be generated, leading to a significant reduction in the amount of light that is controllably reflected by the devices and thus a reduction in their effectiveness.

To the contrary, FIG. 3B shows both the inboard and outboard surfaces of the glass window 300' being provided with ARSWS 500-1, 500-2 and thus at least substantially attenuate/prevent the generation of reflections Ra and Rb, which tend to be associated with incident light beam IL.

Figure 4B:
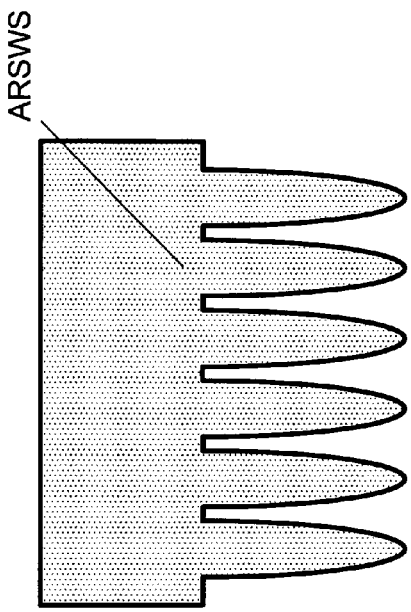

FIGS. 4A and 4B schematically show stochastically distributed conical/frusto-conical members that shall be referred to as "spires" 401, 402 on the upper and lower surfaces of a transparent member 404. These spires, 401, 402 which help to form the ARSWS, can be formed using one of several different techniques. For example, Step and Flash Imprint Lithography (SFIL), Self Assembled Nano Masks (SANM), Interference Lithography, traditional semiconductor projection lithography, and/or other like techniques may be employed to form spires 401 and 402.

Figure 4C:
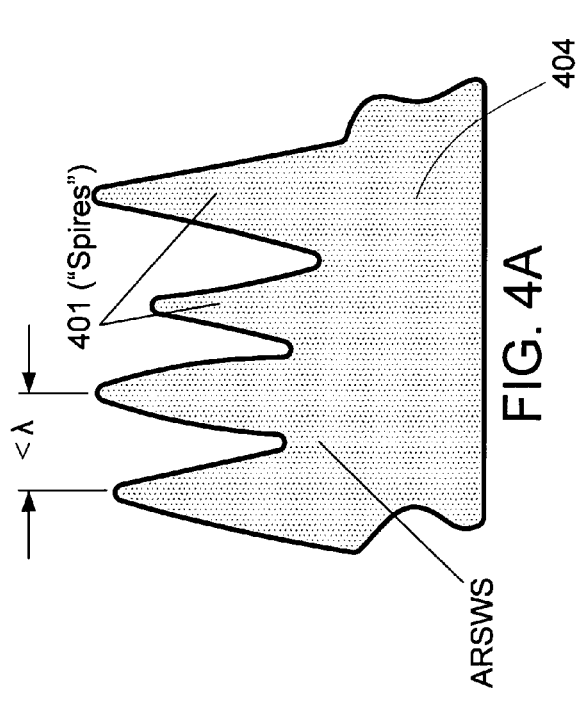
FIGS. 4C and 4D are schematic cross sections showing representative SWS structures that can be formed on upper and/or lower surfaces of a transparent member, in accordance with certain embodiments of the present invention.
Figure 4D:
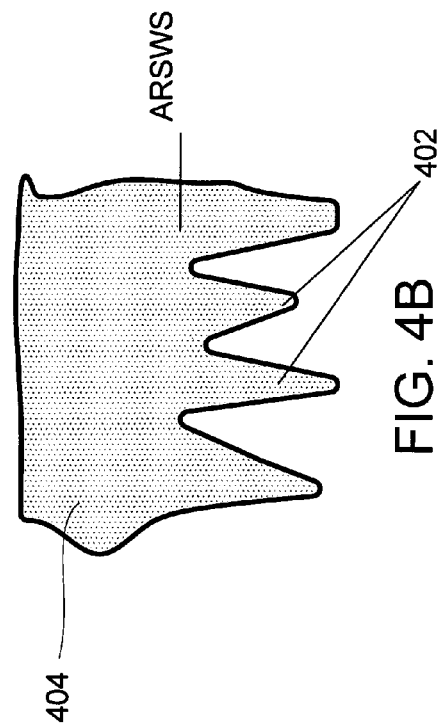

In accordance with certain embodiments of the present invention, the spires can take the form of uniform and periodic features (such as shown in FIGS. 4C and 4D), stochastically distributed features (such as shown in FIGS. 4A and 4B), or a mixture thereof. In certain embodiments, such features have geometric sizes on the order of, or smaller than, the wavelength of the incident light (e.g. about 200 nm) and an aspect ratio of about 1:1 or greater such that the surface behaves like a homogeneous and continuous effective index gradient between the substrate and the surrounding medium.

For brevity of disclosure only two of these techniques will be discussed in detail inasmuch as interference lithography and traditional semiconductor projection lithography are known and well within the grasp of those skilled in the art of lithograph. These are SFIL and SANM.

SFIL entails the use of a quartz mold embossed with relief structures that is pressed with low force into a low viscosity organosilicon layer. The organosilicon layer is photosensitive, and exposure through the template to either broadband illumination or radiation of a certain wavelength results in crosslinking of the organosilicon monomers. The resulting imprinted image becomes the basis of the mask used to pattern transfer a structure on the substrate via an etching process. The SFIL process can provide, for example, one-dimensional and two-dimensional uniform and periodic SWS pattern transfer, low temperature and low pressure imprinting, patterning with traditional semiconductor processing, high volume and repeatable patterning, and/or very low reflectance surfaces.

SANM, on the other hand, utilizes a self assembly technique associated with thin film deposition processes. With this process a thin layer of material is deposited onto the surface of the substrate. This material (gold, for example) will agglomerate when heated to a specific temperature based on the nucleation and lateral migration characteristics of the material. The bead-like pattern that is formed is a discontinuous and stochastically distributed array of 'islands' that tend to have, for example, an area averaging in size between about 50 A and about 200 A. These 'islands' become the basis of the mask used to pattern transfer the 'island' structures on the substrate via an etching process. The SANM process can provide, for example, 'RMS Uniform' two-dimensional structures, simple and low cost manufacturing with thin film technology process equipment, large area processing, processing on curved and non-uniform surfaces, and/or very low reflectance surfaces.

In summary, the SANM technique allows for the formation of "nano dots" ('islands') of a predetermined material (e.g. gold) or a discontinuous (e.g. gold) deposition which is subsequently exposed to an etching process (such as plasma etching using $CF_4$ for example). By controlling the etchings parameters/time, it is possible to remove the "nano dots" and control the depth of the etching process and form spires of the nature mentioned above.

Figure 5:
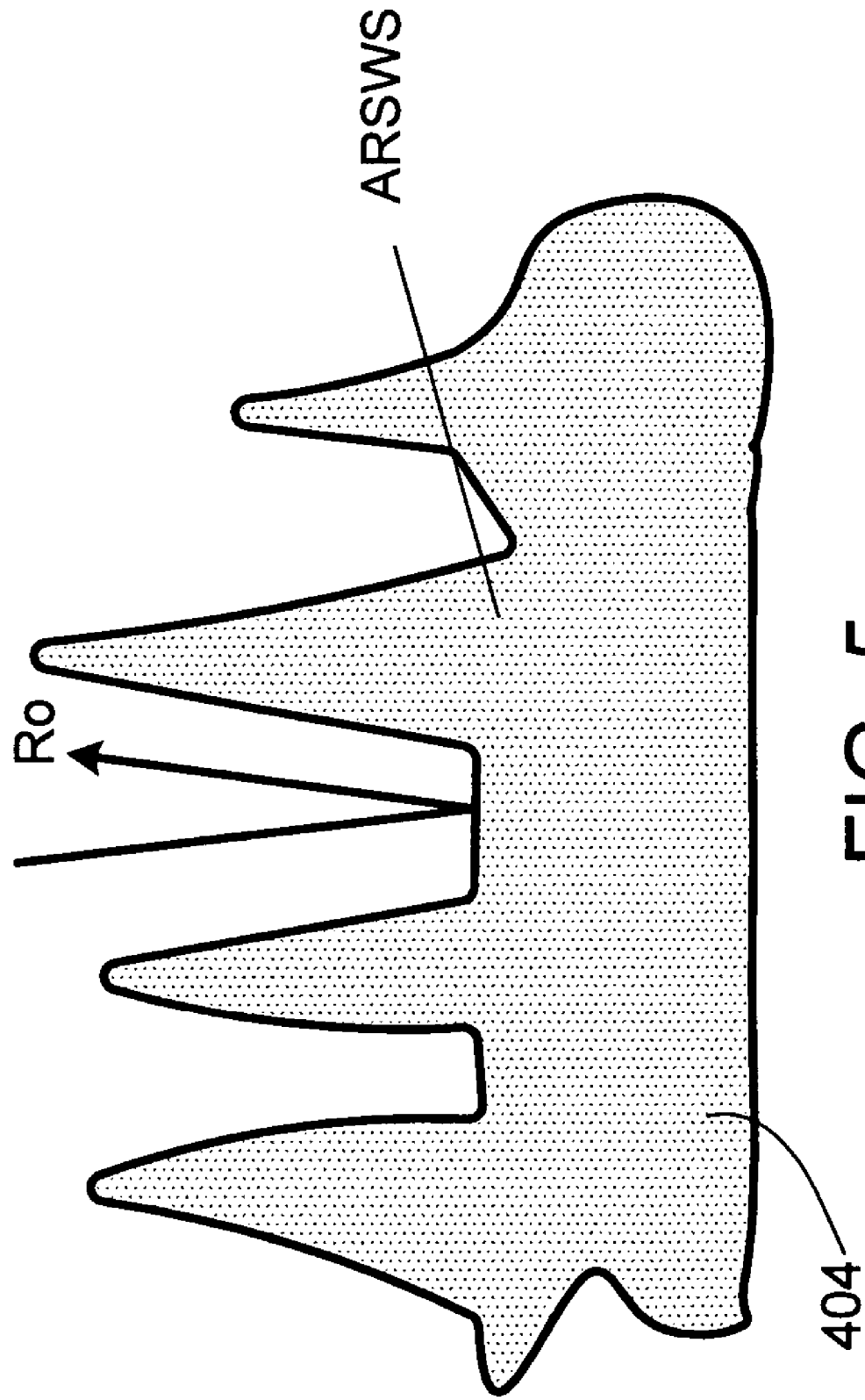
FIG. 5 is a schematic cross section showing a reflection associated with the structured shaped spires shown in FIG. 4A, in accordance with certain aspects of the present invention.

In accordance with certain exemplary embodiments of the present invention, such nano-imprinting (SFIL) and etchings (SANM) processes and the like are employed to emboss a very large number of spires on the surface of the transparent member having an aspect ratio from about 1:1 to about 3:1 or greater. That is to say, the spires have a height to base ratio from 1:1 to about 3:1 or greater. This has been found to produce good AR properties in certain implementations. The embossing also tends to allow the gaps between the bases of spires to be reduced in size/number or prevented. To the contrary, as shown in FIG. 5, when the bases of the spires are sufficiently separated by larger gaps (e.g. gaps on the order of 300 nm or greater) in a manner which produces surfaces with low angles (with respect to a direction normal to the substrate or transparent member 404) a ray of light Ro may pass unimpeded between the spires and reflect back off the relatively flat surface exposed in the gap. This tends to markedly reduce the efficiency of the ARSWS.

With the SANM technique however, the shape/configuration of the spires can vary from spire to spire and tends to be less uniform than those produced using the SFIL technique. Nevertheless, the lack of uniformity of the spires produced using the SANM technique has not been observed to reduce the AR effect of the embossing produced.

Certain embodiments of the invention involve the application of the embossing to an interferometer type reflection device (ITRD) which has been developed for use in the type of projection arrangement typified FIG. 2. In this instance however, the color generating device 202 can be omitted inasmuch as the ITRD is itself capable of producing color using a white incident light.

For example, one exemplary ITRD arrangement includes a transparent member and a reflective member, wherein one is arranged to move with respect to the other or they are arranged to move toward and away from each other under the control of electrostatic and/or electromechanical force that is produced, for example, by controlling a charge differential induced between the two members and/or a flexure of a piezoelectric pile. The arrangements illustrated in this disclosure are such that the transparent member 501 (see, e.g., FIG. 6) is schematically shown suspended on flexures 504 to as to be movable toward and away from the static reflective member 502. However, the reverse (wherein the reflective member moves with respect to the transparent member) can be incorporated into a different embodiment.

The control of the distance between the transparent and reflective members is such that the distance or gap 505 between the movable and static members is varied so that light which enters the gap is multiply reflected and undergoes constructive and/or destructive interference. This permits white incident light to enter the gap, and one of red, green or blue light to be emitted depending on the distance (gap) established between the transparent and reflective members. Under given circumstances, totally destructive interference occurs and no light or "black" results.

Figure 6:
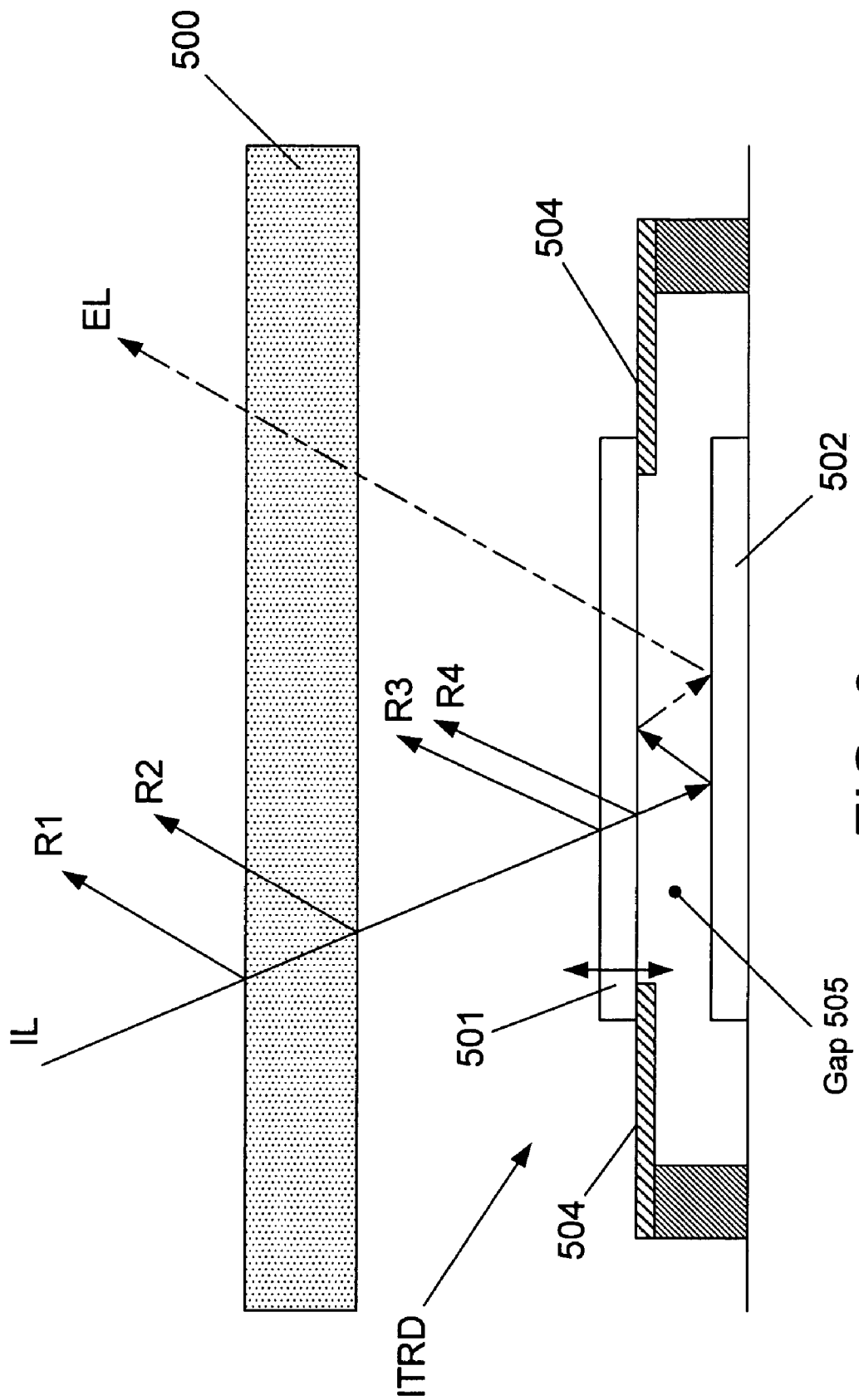
FIG. 6 is a schematic diagram showing reflections off of transparent members which are associated with an inferometer type of device that converts white light into different colors.

FIG. 6 shows an example of such an arrangement. The interferometer type reflective device (ITRD) is shown protected by a transparent covering 500 such as the glass window of a package in which a matrix (columns/rows) of a very large number of these devices is disposed. This figure depicts, for the sake of explanation, a number of possible reflections (illustrated as arrows) which can be generated. R1 is a reflection off of an outboard surface of transparent covering 500. R2 is a reflection off of an inboard surface of transparent covering 500. R3 and R4 are respectively reflections which can be produced by outboard and inboard surfaces of the movable transparent member 501.

Figure 7:
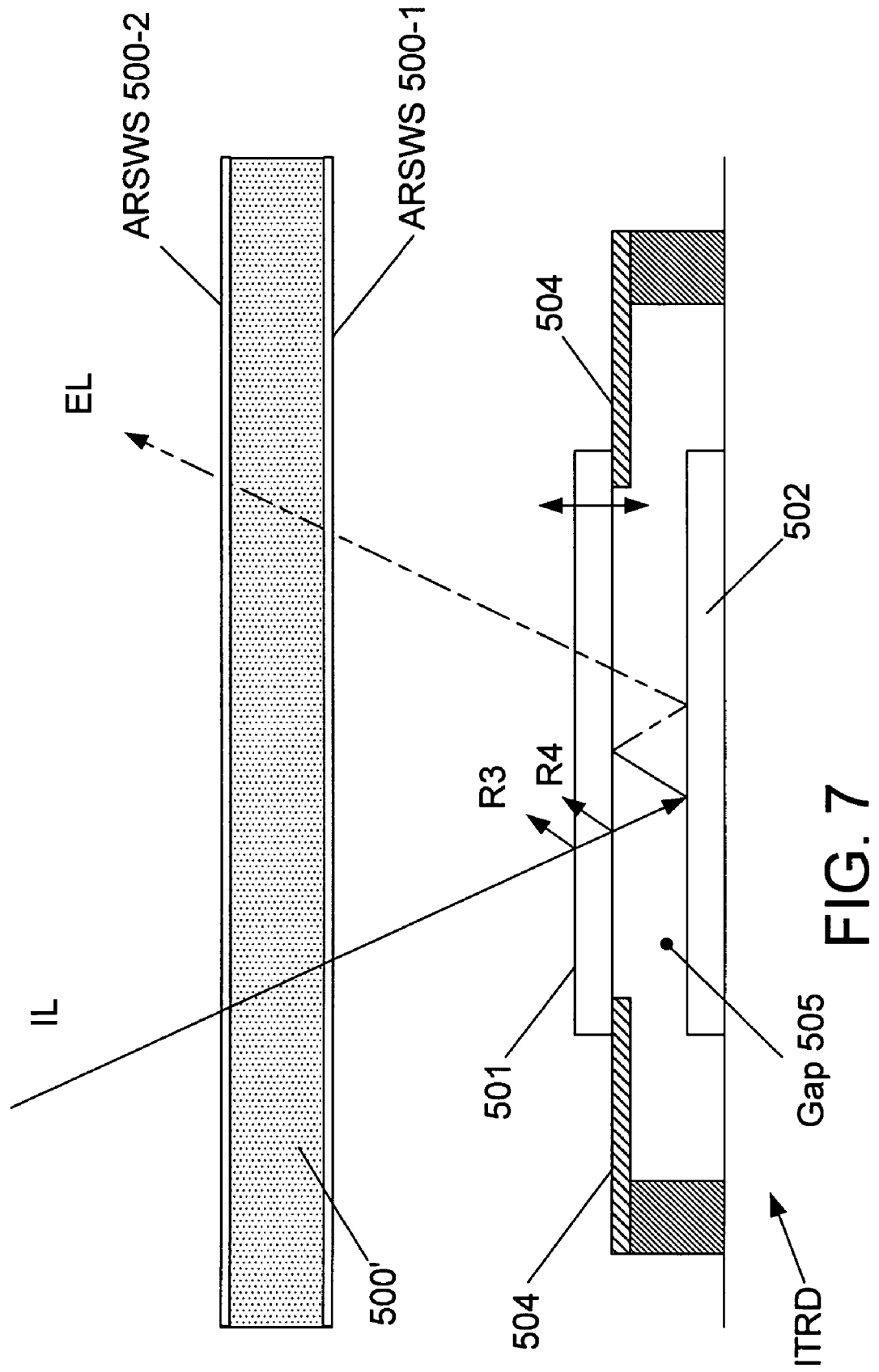
FIG. 7 is a schematic diagram showing an embodiment of the invention wherein embossed surfaces are applied to one of the transparent members shown in FIG. 6.

In this figure, the incident light (IL) is white light and the emitted light (EL) is one of red, green or blue light due to the interference which occurs between the transparent and reflective members. It should, however, be noted that the incoming incident beam IL need not be limited to white light. If the gap between the members (501 and 502) is reduced sufficiently no light is emitted. This may be referred to as a "snap down" effect to produce "black", FIG. 7 shows an embodiment similar to that of FIG. 6 but wherein transparent covering 500' includes ARSWS embossing 500-1, 500-2 on the inboard and outboard surfaces, respectively. A comparison of FIG. 6 to FIG. 7, shows that transparent covering 500' attenuates reflections R1 and R2.

Figure 8:
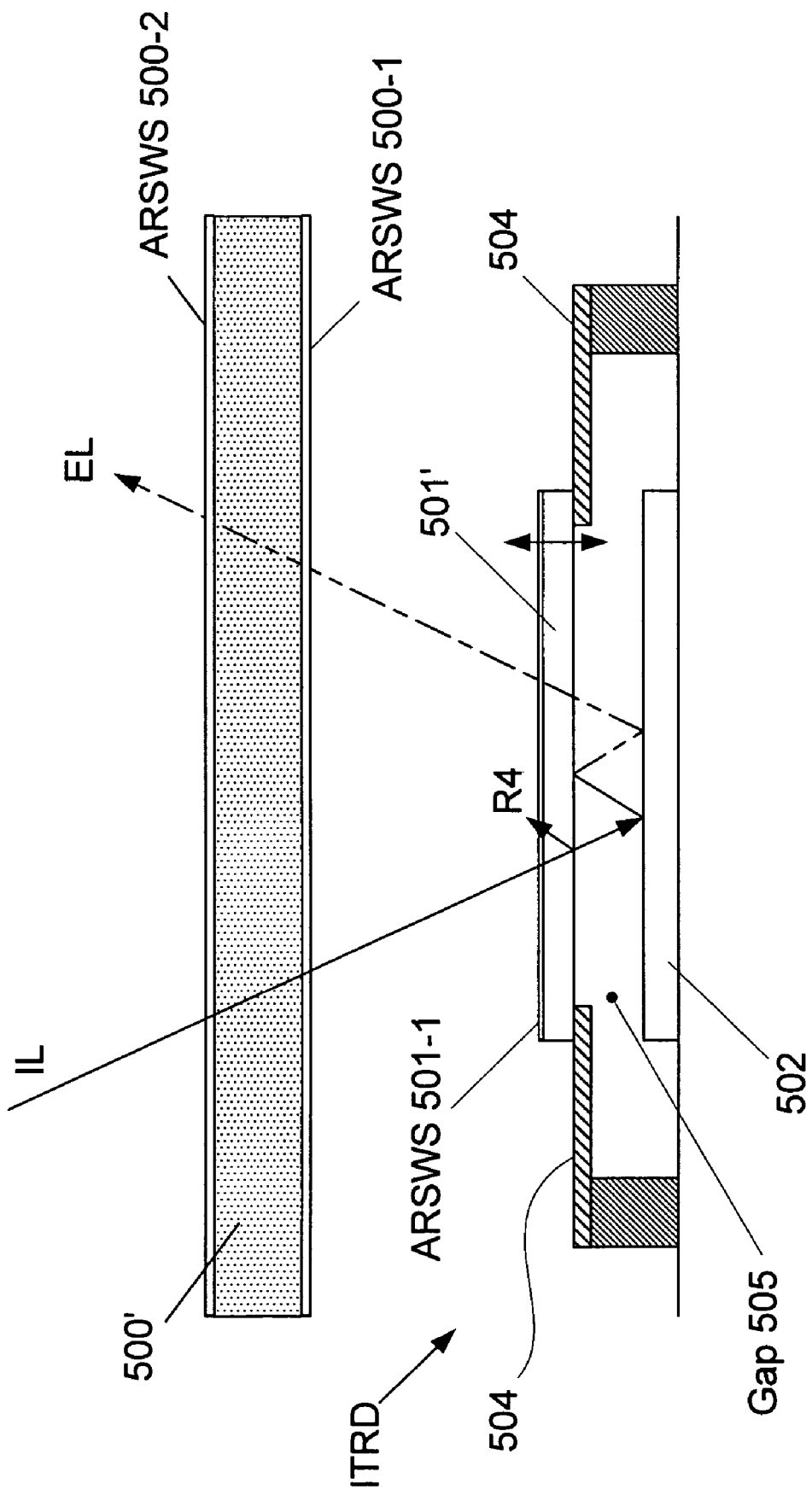
FIG. 8 is a view similar to that shown in FIG. 7 showing an embodiment of the present invention wherein additional ARSWS embossment is provided on a moving element of a pixel defining interferometer arrangement.

FIG. 8 shows a further embodiment similar to that of FIGS. 6 and 7 but wherein, in addition to transparent covering 500', the outer surface of a movable transparent member 501' includes ARSWS embossing 509. A comparison of FIG. 6 to FIG. 8, shows that movable transparent member 501' attenuates reflection R3.

FIG. 9 shows an embodiment wherein a beam splitter prism 599 is arranged with a retarder 520. The retarder 520 rotates the light polarized by the reflection within the beam splitter 599 and induces the situation wherein the emitted light EL may pass through the beam splitter 599 while light Ru which has reflected off the upper surface of the retarder 520, and is not rotated to by the retarder 520, is reflected back out of the beam splitter prism 599 thus preventing this reflected light from being transmitted along with the emitted light EL along a projection path toward a projection lens, for example.

In the arrangement illustrated in FIG. 9, an ARSWS 520-1 is formed on the inboard surface of the retarder 520 to attenuate reflection and loss of the emitted light EL.

Figure 10A:
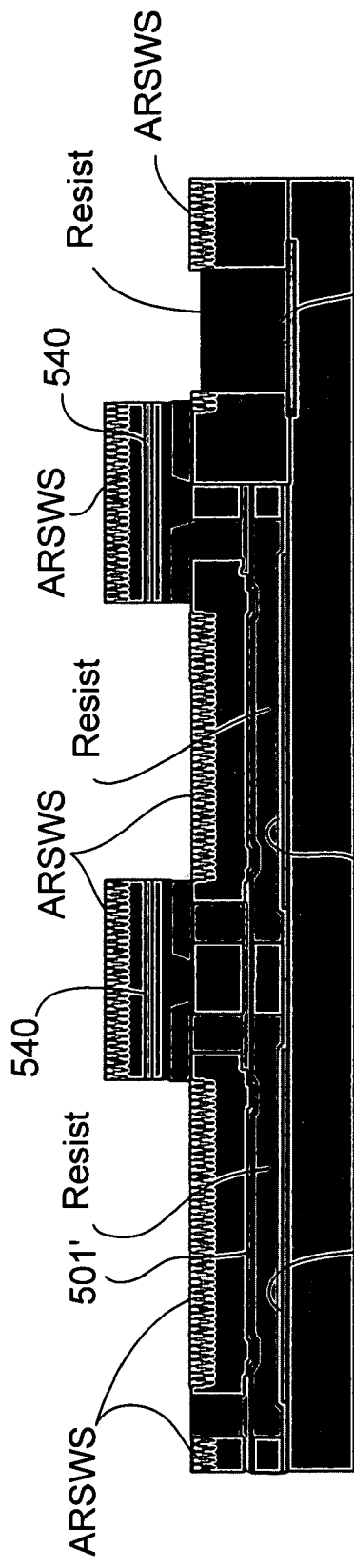
FIGS. 10A and 10B show an embodiment of the present invention wherein ARSWS layers attenuate reflection of light prior to undergoing constructive/destructive interference.
Figure 10B:
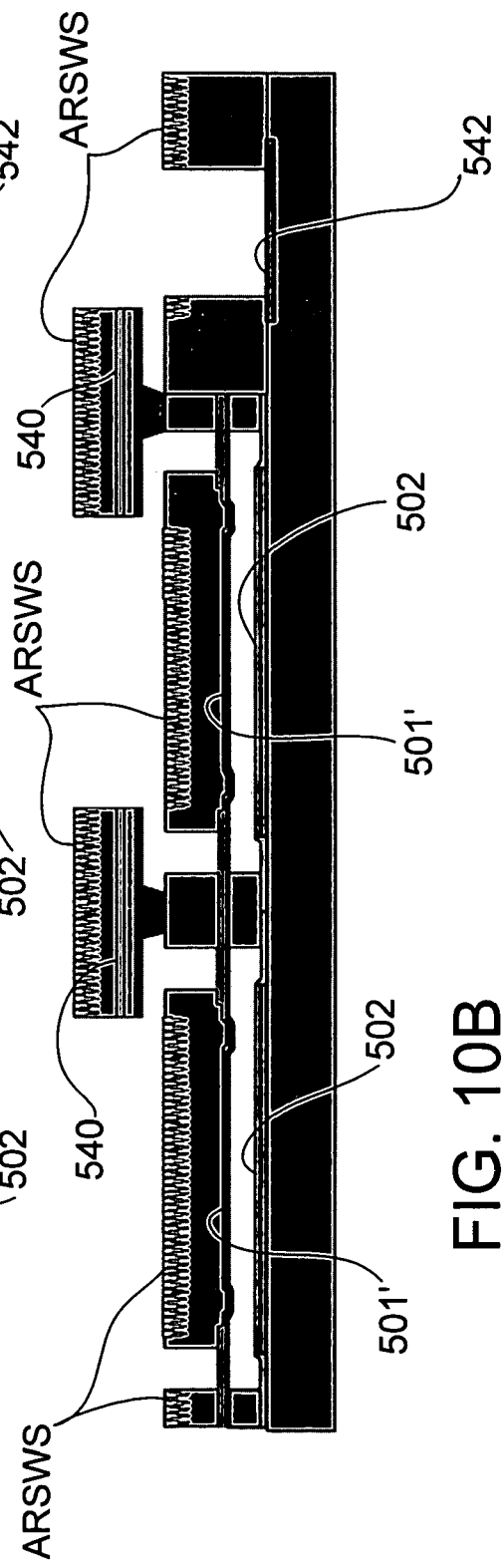

FIGS. 10A and 10B show an example of embossing being formed on the movable transparent member 501' of an ITRD. FIG. 10A depicts the situation wherein plasma etching (viz., the SANM process) has been used to form a myriad of spires of the nature above and thus emboss the surface of the movable transparent members 501' shown in this embodiment. FIG. 10B shows the situation wherein the resist, which is shown in FIG. 1A, is removed from the spaces below and adjacent the movable members to render each of the transparent members 501' movable with respect to each of the corresponding fixed reflective base member 502.

As will be appreciated, arrangements 540 which, in FIGS. 10A and 10B resemble "umbrellas," are formed between the pixel generating arrangements. These umbrella arrangements 540, are in fact shields which are arranged to prevent light, which does not travel along path which are intersective with the movable transparent members 501 of the pixel generating elements, from reflecting off structures adjacent the pixel defining arrangements. Although not shown in the drawings, these umbrella arrangements 540 are in fact rectangular frame-like structures which are arranged to boarder the pixel generating elements in order to attenuate any unwanted reflection. Electrical connection sites 542 are uncovered when the resist is removed. These serve to enable connection between control circuits and the matrix of pixel defining elements.

FIGS. 11A and 11B schematically show single and dual gap type package arrangements respectively, and how the ARSWS embossments can be arranged therein. The arrangement shown in FIGS. 10A and 10B is an embodiment of the invention which is classified as a single gap arrangement.

In the embodiment of the single gap arrangement, depicted schematically in FIG. 11A, the retarder 1120 is formed of a material which is selected to match the refractive index of the beam-splitter prism BS and wherein two surfaces within the chamber in which the pixel generating ITRD are provided with ARSWS embossing. That is to say, the upper surface of the transparent movable elements 1122 of each of the pixel generating elements 1124 and the inner surface 1120-1 of the retarder 1120 are provided with ARSWS embossing. This arrangement is packaged in a hermetic environmentally controlled atmosphere (not show per se) so as to control the gaseous content of the gap (Gap-1) after the retarder 1120 is fixed to a housing member 1126 which encloses the pixel generating elements 1124.

The embodiment of the dual gap arrangement on the other hand is, as shown in FIG. 11B, such that retarder 1120 is formed of a material which is selected to match that of the beam splitting prism BS, but in this case a second gap (Gap-2) is formed, and the transparent member 1125 which separates the pixel generating elements from the retarder, is formed with a ARSWS embossing along with the inner (inboard) surface of the retarder 1120. This embodiment, due to the continuously flat surfaces which are involved, permits the embossing to be carried out using nano-imprinting. This arrangement is also packaged in a hermetic environmentally controlled atmosphere so as to control the gaseous content of the dual gaps.

As will be appreciated, the gaps (Gap-1) in which the transparent movable elements 1122 are disposed must be filled with gas in order to allow for the rapid displacement of the same. While Gap-2, in one embodiment, can be filled with a liquid which has a refractive index selected to match that of the retarder 1120 and the transparent member 1125, it is preferred in the embodiment illustrated in FIG. 11B, to use the ARSWS to obviate the difficulty of working with liquids and allow Gap-2 to be filled with a gas having the same content as the gas in Gap-1.

Figure 12:
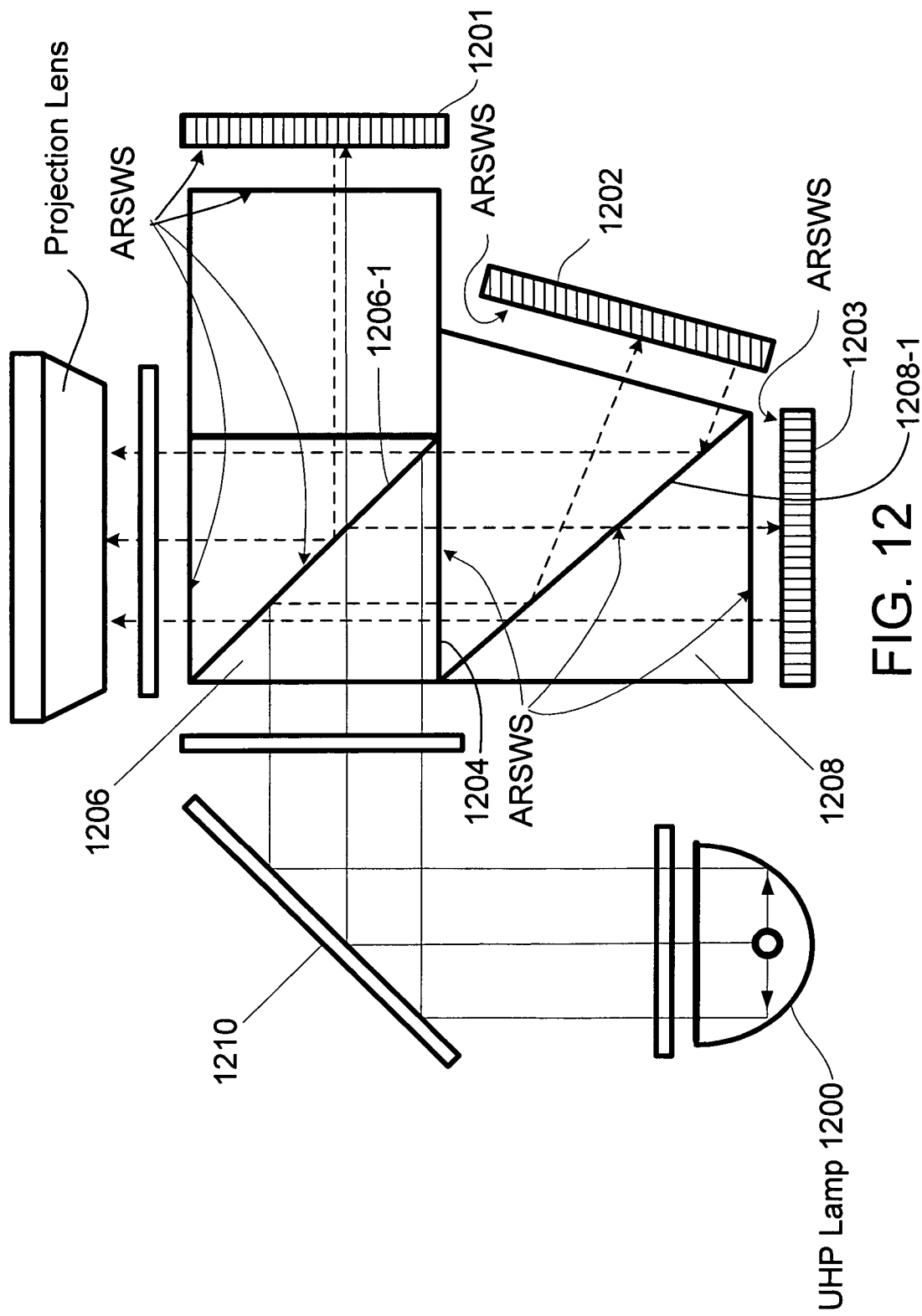
FIG. 12 is a schematic diagram showing a LCoS type spatial light modulator optical system showing surfaces to which the ARSWS embossing can be provided in accordance with certain embodiments of the present invention.

FIG. 12 shows an embodiment of the invention wherein the ARSWS is applied to a LCoS type of arrangement. In this arrangement, the ARSWS embossing can be provided on the surfaces of the red, green and blue LCoS panels 1201, 1202 and 1203 and at the interface 1204 between the beam splitters 1206 and 1208. Alternatively, in further embodiments, the ARSWS can additionally be provided along the beam splitting interface. The disposition of the ARSWS obviates the reflection of white light in a manner that it may find its way into the projection lens (path).

Inasmuch as the operation of LCoS spatial light modulator optical systems is well known to those skilled in this art, only a brief overview of the operation of this type of arrangement will be given. In a nutshell, white light from the ultra high power lamp 1200 is reflected by mirror 1210 into the first beam splitter 12012. At this time the incoming beam is split into red and blue beams at the beam splitting interface 1206-I. The red beam is reflected down toward the LCoS panel 1203. The blue beam which is split off in the first beam splitter is directed the LCoS 1201. The red beam entering the second beam splitter 1208 is again split at the splitting interface 1208-I, and a green beam is directed to the LCoS panel 1202.

Suitably timed opening and closing of the liquid crystal shutters in the LCoS panels 1203, 1202 and 1201 respectively enables red image pixels to be reflected from LCoS panel 1203, green image pixels to be reflected from the LCoS panel 1202, and blue image pixels from the LCoS panel 1201. The green and blue pixels are reflected at the beam splitting interfaces 1208-I and 1206-I in the beam splitters 1208 and 1206. The red pixels, on the other hand, are such that they pass through both the beam splitters 1208 and 1206 without reflection. The red, green and blue pixels are combined to produce the requisite color pixels/image via the projection lens.

In accordance with an embodiment of the invention ARSWS are provided on one or more of the faces of the LCoS panels 1201, 1202 and 1203, the interface between the beam splitters and on the beam splitting interfaces in the manner generally indicated. The provision of the ARSWS prevents reflection that reduces the amount of light which is directed into the projection lens. It will be noted however, that the provision of an ARSWS, when provided along the beam splitting interfaces may shift the 50/50 beam splitting effect slightly. However, no detrimental effect should be observed due to this shift.

While the invention has been described with only reference to a limited number of embodiments, it will be understood that a person skilled in the art to which the present invention pertains or most closely pertains, would be able to envisage and make various changes and modifications without departing from the scope of the present invention which is limited only by the appended claims.

For example, in the above disclosed embodiments it is possible to space the peaks of the embossment spires by about 200 nm. This spacing is less than the lower wavelength of white light (e.g. 300 nm) and therefore effective to prevent reflection from the embossments. It also within the scope of the invention to have embodiments wherein the heights and widths of the projections are also be subwavelegth in dimension.

What is claimed is:

1. An optical system having a radiation transparent member, comprising:
   a light source that produces a beam of light;
   a device for selectively modifying the beam of light, the device including the radiation transparent member and a reflective member which are arranged to be movable with respect to one another; and
   an anti-reflective embossment embossed into at least one surface of the radiation transparent member, the embossment comprising spaced structures configured to permit incident radiation to pass through the embossment and the radiation transparent member, and to, at least, attenuate reflection of the incident radiation off the embossment, the structures being maximally spaced from one another by a subwavelength of the incident radiation.

2. An optical system as set forth in claim 1, wherein the beam of light is white light and wherein the light source produces the white light.

3. An optical system as set forth in claim 2, wherein the device comprises a spatial light modulator device.

4. An optical system as set forth in claim 3, wherein the spatial light modulator device comprises at least one of a DMMD, a LCoS and an interferometer type reflection device.

5. An optical system as set forth in claim 2, wherein the device is enclosed in a package comprising at least one transparent element.

6. An optical system as set forth in claim 5, wherein the at least one transparent element comprises a sheet of glass.

7. An optical system as set forth in claim 5, wherein at least one side of the transparent element is embossed with the anti-reflective embossment.

8. An optical system as set forth in claim 1, wherein the distance between the radiation transparent member and the reflective member is selectively controlled so that light, which enters a gap between the radiation transparent member and the reflective member, is reflected between the radiation transparent member and the reflective member to induce constructive and/or destructive interference and to result in the modified beam of light.

9. An optical system as set forth in claim 8, wherein the radiation transparent member has a surface, which is outboard with respect to the reflective member, embossed with the embossment.

10. An optical system as set forth in claim 8, wherein the selective control is implemented using electrostatic actuation.

11. An optical system as set forth in claim 10, further comprising a retarder optical component for rotating an angle of polarization of light which is polarized by reflection in the beam splitting prism.

12. An optical system as set forth in claim 11, wherein the retarder layer comprises the light transmitting member.

13. An optical system as set forth in claim 2, wherein the optical system further comprises a beam splitting prism arranged to receive the beam of light from the light source and to reflect the beam of light in a first direction into the device and wherein the modified beam of light is directed out through the beam splitting prism.

14. An optical system as set forth in claim 1, wherein the structures are projections having radiation subwavelength dimensions.

15. An optical system as set forth in claim 14, wherein the projections are about 3-4 times higher than their base width.

16. An optical system as set forth in claim 14, wherein the projections have bases which are located proximate and/or merge with those of adjacent projections in a manner which attenuates low angle surfaces which can reflect light back away from the light transmitting member.

17. An optical system as set forth in claim 14, wherein the projections are one of essentially conical or frusto-conical in configuration.

18. An optical system as set forth in claim 1, wherein the projections are formed so that a low angle surface between the projections and which can reflect incident radiation is essentially absent.

19. An embossed anti-reflection surface in an image projection arrangement comprising:
  a plurality of projections formed in a surface of a radiation transparent member through which radiation, having a wavelength range, passes to an image formation device, peaks of the projections being separated by distances which are less than any wavelength in a wavelength range of radiation;
  wherein the image formation device comprises a matrix of elements which modify the incident radiation;
  wherein the matrix of elements each comprise the radiation transparent member and a radiation reflective member which are arranged to be movable with respect one another.

20. An embossed anti-reflection surface as set forth in claim 19, wherein the radiation has a wavelength or wavelength range which falls within a range of white light.

21. An embossed anti-reflection surface as set forth in claim 20, wherein a gap formed between the radiation transparent member and the radiation reflective member can be selectively controlled to induce radiation passing through the radiation transparent member to be reflected in a manner which induces constructive or destructive interference and modify radiation which is emitted back through the transparent member.

22. An embossed anti reflection surface in an image projection arrangement comprising:
  a plurality of nano-scale projections formed in a surface of a transparent member which forms part of each of a matrix of light modifying elements that form an image formation device;
  wherein the matrix of light modifying elements modify the incident radiation;
  wherein the matrix of light modifying elements each comprise a radiation transparent member and a radiation reflective member which are arranged to be movable with respect one another.

23. An image formation device, comprising:
  means for transmitting light, the means for transmitting having a surface;
  means for attenuating reflection from the surface using essentially conical/frustoconical-shaped nanostructures which have peaks that are spaced by a distance less than any wavelength in a wavelength range of white light;
  means for reflecting light, the means for reflecting light having a radiation transparent member and a reflective member which are arranged to be movable with respect one another.

24. An image formation device, comprising:
  a plurality of transparent members arranged in a predetermined spatial relationship; and
  an anti-reflective embossment formed in a surface of at least two of the plurality of transparent members, the anti-reflective embossment comprising essentially conical/frustoconical-shaped nanostructures which have peaks that are spaced by a distance less than a wavelength in a wavelength range of visible white light;
  wherein at least one of the plurality of transparent members and a reflective member are arranged to be movable with respect to one another.

* * * * *